Aug. 18, 1970  G. SCHUSTER  3,524,217
POULTRY PICKING MACHINE
Filed May 1, 1968  3 Sheets-Sheet 1
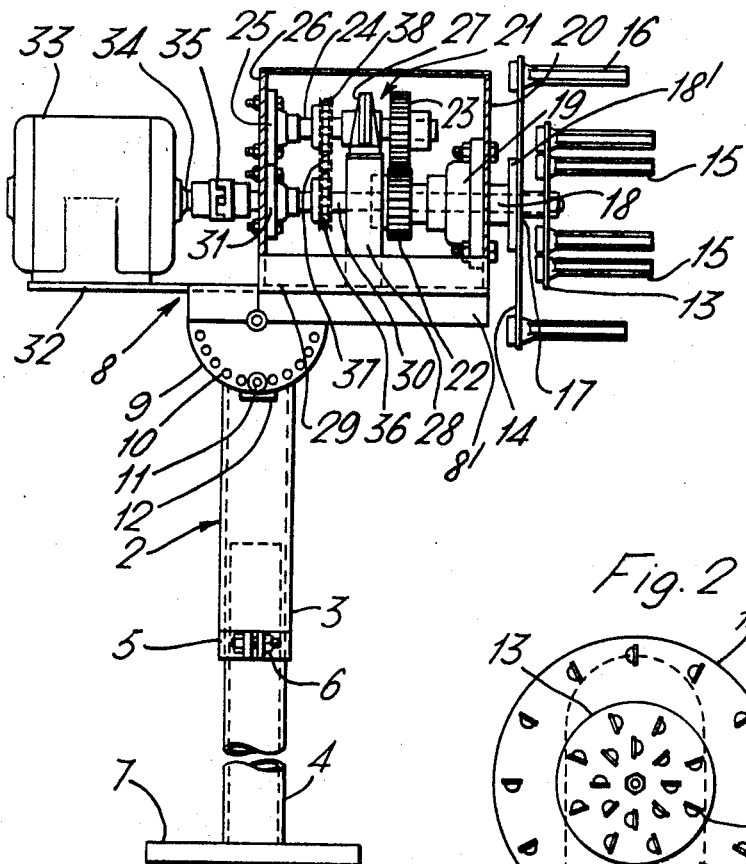
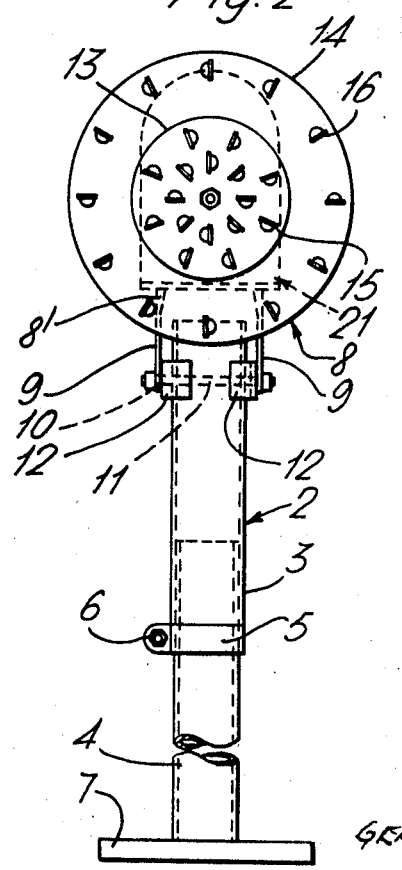
GERHARD SCHUSTER
INVENTOR
BY
ATTORNEY

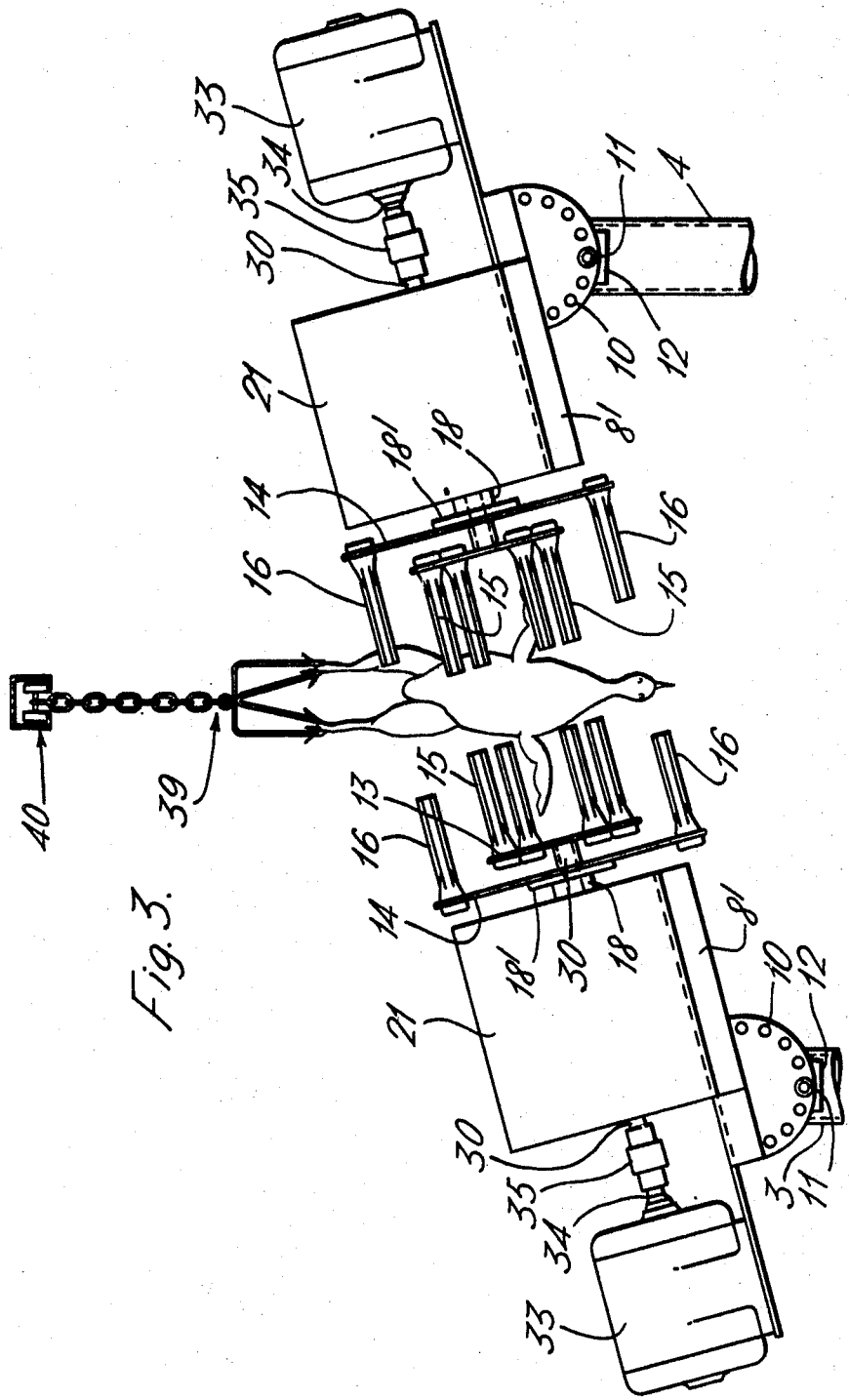

Aug. 18, 1970   G. SCHUSTER   3,524,217
POULTRY PICKING MACHINE
Filed May 1, 1968   3 Sheets-Sheet 3
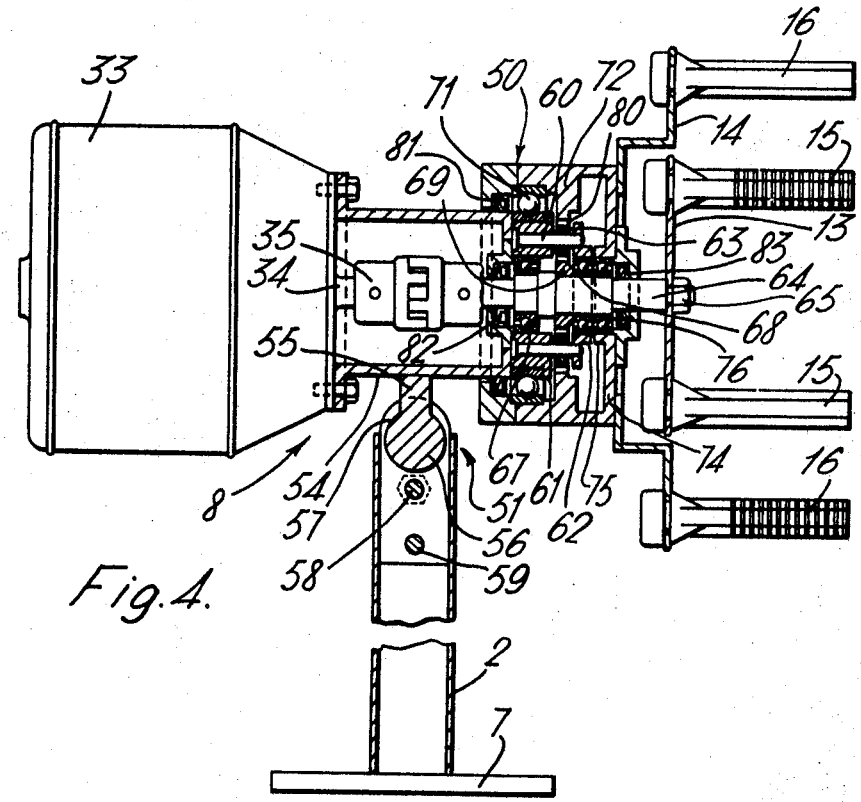
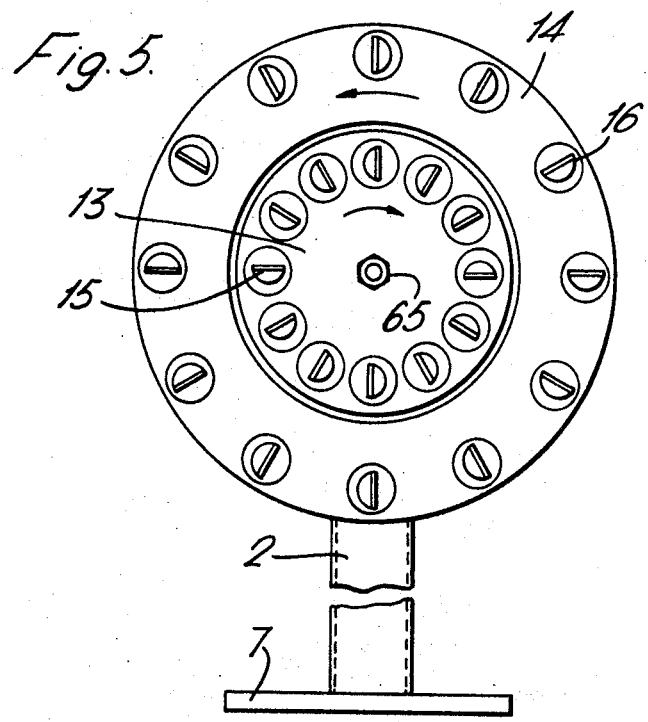
GERHARD SCHUSTER
INVENTOR
BY Lawrence J. Field
ATTORNEY

United States Patent Office 3,524,217
Patented Aug. 18, 1970

3,524,217
POULTRY PICKING MACHINE
Gerhard Schuster, 82 Childs Drive,
Aurora, Ontario, Canada
Filed May 1, 1968, Ser. No. 725,773
Claims priority, application Canada, Feb. 6, 1968
011,761
Int. Cl. A22c 21/02
U.S. Cl. 17—11.1                                    5 Claims

ABSTRACT OF THE DISCLOSURE

A poultry picking machine for removing feathers from fowl, the machine being provided with two sets of counter-rotating picking elements or fingers which in use are counter-rotated at speeds which result in the two sets of fingers rotating at substantially the same speeds.

---

This invention relates to a machine for picking feathers from poultry and in particular chickens.

Rotary drum type poultry picking machines are well known in the art. These known poultry picking machines customarily employ a plurality of parallel rotary drums or discs having a plurality of flexible rubber picking fingers extending therefrom to remove feathers from a chicken or the like suspended from a shackle depending from a conveyor, each pair of rotary drums or parallel discs being effective to remove the feathers from a portion of the body of the fowl. A number of pairs of rotary drums or parallel discs are used to accomplish the removal of feathers from all areas of the body of the fowl.

In order to remove feathers from a selected area of the fowl body, in particular an area which is not easily accessible, it has been customary to employ devices e.g. head-holding devices to maintain the fowl stable relative to the rotary drums or discs during feather removal. As will be appreciated, the additional devices for maintaining the fowl stable increases the cost of the operation for a number of obvious reasons, including the substantial floor space required for the operation. For example, using the presently known chicken picking machines, employing a pair of rotary drums or disc-type pickers operating in conjunction with a suspension type conveyor, one requires a floor space of approximately 50 sq. ft. Furthermore, for economic operation a processing speed of possibly 1,000 chickens per hour is required.

Further, the known machines are not particularly well adapted for large changes in the size of fowl to be processed. Particularly in the expanding operations of the Canadian fowl processor, there has been a requirement for versatility in a poultry picking machine, whereby all types and sizes of poultry may be processed with a minimum of accommodating adjustments to the apparatus.

With a view to overcoming the aforementioned shortcomings of the known poultry pickers, this invention provides a poultry picking machine for removing feathers from a fowl comprising at least one feather removal unit and means arranged to maintain the fowl in working engagement with the feather removal unit. Each feather removal unit comprises inner and outer concentrically arranged fowl picking elements and means for rotating the inner fowl picking elements, and separately the outer fowl picking elements in opposite directions that is counter-rotating them at such rotational speeds relative to each other that the tips of the inner and outer fowl picking elements have substantially the same peripheral speed whereby to achieve stability of the fowl during feather removal.

Preferably, each feather removal unit is pivotably adjustable on vertical and horizontal axes and linearly adjustable in height, that is in a vertical direction.

By virtue of its adjustability the machine is versatile and is adapted to handle all types and sizes of poultry. The adjustability of the feather removal unit until also makes it possible to selectively concentrate the fowl picking elements onto hard to reach places such as hocks and wing-backs.

Further, while a poultry picking machine employing a single feather removal unit would suffice for a small volume operation e.g. a manual operation, the preferred form of the invention embodies at least one and preferably more pairs of substantially identical feather removal units, each pair being spaced apart in opposed relation to each other, and with different pairs being differently oriented to provide a passage therebetween for a fowl suspended from a conveyor, the orientation of each pair of units, when more than one pair is employed being such as will insure that all feather bearing parts of the fowl being plucked can be reached by the fingers.

The present invention will now be described with reference to the accompanying drawings which illustrate, by way of example, two preferred embodiments of the invention and in which:

FIG. 1 is a side elevational view, partly sectioned of one feather removal unit of the poultry picking machine constructed in accordance with one of the preferred embodiments of the present invention;

FIG. 2 is a front view of FIG. 1;

FIG. 3 is a side elevational view of a poultry picking machine constructed in accordance with one of the preferred embodiments of the invention showing how a pair of units is arranged relative to a fowl to be plucked;

FIG. 4 is a side elevational view, partly sectioned, of another feather removal unit of the poultry picking machine constructed in accordance with another preferred embodiment of the present invention; and FIG. 5 is a front view of FIG. 4.

The poultry picking machine of the present invention as shown in FIGS. 1 to 3 will be seen to comprise a telescopic pedestal 2 having telescoping portions 3 and 4 and a clamping ring 5 having a bolt 6 extending through the ends thereof in the manner shown to secure the clamping ring 5 relative to the portion 4. The clamping ring 5 abuts the end of the portion 3 and thus by altering the position of the clamping ring on the portion 4, the height of the pedestal 2 may be varied as required. The lower portion 4 of the telescopic pedestal may be secured to a base 7 and may be set on the floor as in FIG. 3, mounted above a feather conveyor, permanently attached to an overhead beam or supported on a suitable frame.

It will also be readily understood that the portion 3 may pivot rotatably with respect to the portion 4 it being normally locked against pivoting movement by the clamping ring.

A picking device 8 is mounted on the free end of the pedestal 2 for pivotable adjustment in a vertical plane, by means of two semicircular plates 9 secured to flanges 8' depending from the underside of the picking device 8 and having a number of aligned circumferentially arranged apertures 10 therein. A rod 11, passing through a pair of aligned apertures 10 in the plates 9 and a pair of bushings 12 provided adjacent the free end of the pedestal 2, has threaded end portions 13 which receive nuts for securing the plates 9 and, hence, the feather removal unit 8 in the required vertical attitude.

Each picking device 8 comprises an inner disc 13 and an outer disc 14 having a number of fingers 15 and 16 respectively extending therefrom of the type conventionally used for feather removal and preferably made of rubber. The outer disc 14 is centrally apertured as at 17 and is secured to and in alignment with one end of an open, hollow shaft 18 by means of an annular mounting plate 18′ secured to the end of shaft 18. The shaft 18 is rotatably journalled through a bearing 19 in the front wall 20 of a housing 21 and carries at its other end a first gear 22 which meshes with a second gear 23 carried on a shaft 24. The shaft 24 is rotatably mounted in a bearing 25, secured to the rear wall 26 of the housing 21 and is also rotatably journalled through a bearing 27 provided in a bearing support member 28 extending upwardly from the base 29 of the housing 21.

The inner disc 13 is secured to one end of a shaft 30 which extends through the aperture 17 in the outer disc 14, the hollow shaft 18 and a bearing 31 mounted in the rear wall 26 of the housing 21. Shaft 30 is concentrically disposed within the hollow shaft 18 and so dimensioned as to be rotatable with respect to the hollow shaft 18 and the outer disc 14. The base 29 of the housing 21 is extended as at 32 to support an electric motor 33, whose output shaft 34 is coupled by means of a coupling 35 to the shaft 30. The shaft 30 also carries a sprocket 36 which is coupled in driving relation by means of a chain 37 with a sprocket 38 carried on the shaft 24.

It will be seen that rotation of the output shaft 34 of the motor 33 is transmitted directly to the inner disc 13 through the shaft 30 and indirectly to the outer disc 14 through the shaft 30, the sprocket and chain drive 36, 37, 38, the shaft 24, the meshing gears 23 and 22 and the hollow shaft 18. It will be realized that the ratio of the gears 22 and 23 and sprocket and chain system 36, 37, 38 will determine the relative rotational speed of the outer disc 14 with respect to the inner disc 13. Furthermore, in the arrangement shown in FIG. 1, the outer disc 14 will rotate in an opposite direction to the inner disc 13.

During rotation of the discs 13 and 14, the rubber fingers 15 and 16 curl radially outwardly due to centrifugal force. Should the discs 13 and 14 be rotated at the same speed then fingers 16 on the outer disc 14 by virtue of being spaced further away from the common axis of rotation of the discs 13 and 14 than the fingers 15 on the inner disc 13, would be subjected to a greater centrifugal force than the fingers 15 and the peripheral speed of the tips of the fingers 16 on the outer disc 14 would be greater than that of the tips of the fingers 15 on the inner disc 13. Bearing in mind that it is the tips of the fingers 15 and 16 which accomplish the removal of the feathers from the fowl, it will be understood that the difference in peripheral speeds of the fingers 15 and 16 tend to displace the fowl about the rotational axis of the discs 13 and 14 during the feather removal operation and necessitate the provision of additional devices such as head-holding devices to maintain stability of the fowl during the operation, which as already mentioned is undesirable.

In accordance with the embodiment of FIGS. 1 to 3 of the present invention by an appropriate selection of the ratio of the gears 22 and 23 and the sprocket and chain system 36, 37, 38 the rotational speed of the inner disc 13 is made greater than that of the outer disc 14 by an amount which ensures that the peripheral speed of the tips of the fingers 15 on the inner disc 13 is substantially equal to the peripheral speed of the tips of the fingers 16 on the outer disc 14, so that the tendency for the fowl to rotate about the common axis of the discs 13 and 14 is counteracted, thereby maintaining stability of the fowl during the feather removal operation.

Referring to FIGS. 4 and 5 of the drawings, there is shown a second embodiment of the invention which possesses many parts in common with the embodiment illustrated in FIGS. 1 to 3. Specifically, the embodiment of FIGS. 4 and 5 includes a base 7 supporting a pedestal 2 which supports a picking device 8. The picking device 8 includes an electric motor 33, which operates at 860 r.p.m. provided with an output shaft 34 to which is secured a flexible coupling 35 which drives inner and outer discs 13 and 14 in opposite rotational directions through a sealed transmission 50. It will be noted that outer disc 14 is dished. Fingers 15 and 16 are provided on the inner and outer discs 13 and 14 respectively.

While not shown, pedestal 2 can be provided with means whereby the picking device 8 can be raised and lowered. Such means can consist simply of a two-piece telescopic pedestal provided with a rack and pinion arrangement which can be manually actuated to adjust the height of the picking device.

The two significant differences between the embodiment of the invention illustrated in FIGS. 1 to 3 and that illustrated in FIGS. 4 and 5 are firstly, that in the latter a ball and socket arrangement 51 is provided to permit the required positioning of the picking device 8 relative to its pedestal 2 and secondly, the drive arrangement within the sealed transmission 50 utilizes an all gear planetary drive including in conventional manner a sun gear, a pair of planetary gears and an annular gear concentrically arranged about a central drive shaft so as to result in an arrangement where rotation of the sun gear causes counter-rotation of the annular gear.

Referring firstly to the ball and socket arrangement 51, as best seen in FIG. 4 there is provided a cylindrical housing 54 to the left-hand end of which is secured electric motor 33 and on the right-hand end of which is mounted the sealed transmission 50 the contents of which will be further described below. Depending from the lowermost portion of the surface of the cylindrical member 54 is a stem 55 to the free end of which is attached a ball 56 which co-operates with a split socket 57. A nut and bolt 58 passes through an extension of the split socket 57 below the ball 56 and is so arranged as to permit it to be utilized to draw the split portions of the socket towards one another so as to clamp the ball 56 therebetween. If required, stop bolt 59 can be provided, this bolt being so arranged as to be capable of functioning as a stop to limit movement of one split portion of socket 57 towards the other on tightening of the nut and bolt 58. With such an arrangement it is possible to adjust the ball and socket arrangement 51 so that while relative movement between the ball and socket is permitted to allow adjustment of the position of the picking device 8, once the picking device has been placed in its proper position it will remain there without further attention and without having to further adjust either the nut and bolt 58 or stop bolt 59.

Referring now to the sealed transmission 50, it will be noted that there is secured to the right-hand end of the cylindrical housing 54 a pair of pins 60. These pins pass through an annular bearing support 61 and terminate at an annular, flanged bearing support 62 with there being a planetary gear 63 rotatably mounted on each of the pins 60 between support 61 and support 62. The output end of coupling 35 has secured to it an inner disc, drive shaft 34 which passes entirely through the transmission 50 and has the inner disc 13 secured to its free end by a nut 65. Shaft 64 runs in ball bearings 67 and 68 which are fitted in bearing supports 61 and 62 respectively. A sun gear 69 is fixed to shaft 64 so as to be capable of being driven by it, and it in turn meshes with planetary gears 63 so that rotation of shaft 64 will cause rotation of gears 63 through the intermediary of gear 69.

Bearing support 61 also supports externally a large ball bearing 71 on which is rotatably mounted a generally cylindrical housing 72 whose end opposite to that facing the motor 33 is partially closed by an inwardly extending annular flange 74 provided at its inner edge with a cylindrical foot 75 within which is mounted a bearing 76 co-operable with shaft 64 to maintain the required relative positioning between the housing 72 and the shaft 64. The dished outer disc 14 is secured to the flange 74 which is capable of being rotatably driven, through the intermediary of the housing 72 and in a rotational direction opposite to that of shaft 64, by an annular gear 80 secured to an inner wall of housing 72 as shown, the teeth on gear 80 meshing with those on gears 63.

Normally the transmission 50 will be sealed by way of seals 81, 82 and 83 so as to permit the gears to be constantly lubricated by means of an oil bath maintained within the housing 72, thereby to provide a sealed unit requiring little if any periodic maintenance.

In operation, using either embodiments the fowls to be processed are suspended by their feet from shackles 39 hung from a line conveyor 40 which moves the fowl between the pair of fowl picking machines 1 arranged on either side of the line of conveyance. The individual fowl picking machines 1 are adjusted linearly in a vertical direction and angularly in horizontal and vertical directions so that the fingers 15 and 16 may impinge upon any selected area of the body of the fowl. In FIG. 3 where a pair of opposed feather removal units are employed, the peripheral speed of the tips of the fingers on all four discs should be substantially the same.

It will be realized, of course, that the relative rotational speeds at which the discs must rotate to achieve the benefits of the invention will vary with the spacing of the fingers 16 from the axis of rotation and the fingers 15, the attitude in which the fingers 15 and 16 are mounted on the discs 13 and 14 and with the physical characteristics of the fingers such as length and thickness as affected by centrifugal bending.

While only one pair of machines are shown in FIG. 3, it will be realized that a number of pairs of machines may be employed, each pair being arranged to clean a specific area of the fowl. For instance in FIG. 3 the feather removal fingers are disposed to engage areas of the body which are not easily accessible, namely, the wingbacks.

For manual operation only one feather removal unit is required, the fowl being held by the operator in the path of the rotating fingers to accomplish feather removal. In another arrangement (not shown) the fowl may be conveyor fed between a feather removal unit and a smooth flat surface such as a plate to maintain the fowl in working engagement with the fingers 15 and 16 during feather removal.

I claim:

1. A poultry picking machine for removing feathers from a fowl comprising at least one feather removal unit and means arranged to maintain the fowl in working engagement with the feather removal unit, said feather removal unit comprising inner and outer concentrically arranged fowl picking elements and means for separately rotating the inner fowl picking elements and the outer fowl picking elements in relatively opposite directions and at such rotational speeds relative to each other that the tips of the inner and outer fowl picking elements have substantially the same peripheral speed, whereby to achieve stability of the fowl during feather removal.

2. A poultry picking machine for removing feathers from a fowl which comprises at least one pair of feather units spaced apart in opposed relation to provide a passage therebetween for a fowl suspended from a conveyor, each of said feather removal units comprising inner and outer concentrically arranged fowl picking elements and means for separately rotating the inner fowl picking elements and the outer fowl picking elements in relatively opposite directions and at such rotational speeds relative to each other that the tips of the inner and outer fowl picking elements have substantially the same peripheral speed, the peripheral speed of the tips of the fowl picking elements on the one feather removal unit being substantially equal to the peripheral speed of the tips of the fowl picking elements on the other of said feather removal units, whereby to achieve stability of the fowl during feather removal.

3. A fowl picking machine as claimed in claim 2, wherein the outer fowl picking elements on one of said feather removal units is rotatable in an opposite direction to the outer fowl picking elements on the other of said units.

4. A fowl picking machine as claimed in claim 1, wherein each feather removal unit is pivotably adjustable on vertical and horizontal axes and linearly adjustable in a vertical direction.

5. A fowl picking machine as claimed in claim 1, wherein each of said fowl picking elements comprises a flexible finger.

References Cited

UNITED STATES PATENTS

| | | | |
|---|---|---|---|
| 2,444,556 | 7/1948 | Drews | 17—11.1 |
| 2,571,034 | 10/1951 | Harvey | 17—11.1 |
| 2,743,477 | 5/1956 | Barker et al. | 17—11.1 |
| 3,277,515 | 10/1966 | Engkjer | 17—11.1 |

LUCIE H. LAUDENSLAGER, Primary Examiner

U.S. Cl. X.R.

17—47